United States Patent

Benkoczy

Patent Number: 5,698,055
Date of Patent: Dec. 16, 1997

[54] METHOD OF MANUFACTURING COMPOSITE TUBE

[76] Inventor: Andrew J. Benkoczy, 609 Ocean Dr., Apt. 11G, Key Biscayne, Fla. 33149

[21] Appl. No.: 637,204

[22] Filed: Apr. 24, 1996

[51] Int. Cl.⁶ .................................................. B65H 81/00
[52] U.S. Cl. .......................... 156/149; 156/171; 156/173; 156/187; 156/188; 156/194
[58] Field of Search .............................. 156/171, 173, 156/175, 187–190, 86, 194, 148, 149

[56] References Cited

U.S. PATENT DOCUMENTS

| | | | |
|---|---|---|---|
| 2,748,830 | 6/1956 | Nash et al. | 156/171 |
| 3,033,729 | 5/1962 | Shobert | 156/149 |
| 3,491,999 | 1/1970 | Lindler . | |
| 3,507,023 | 4/1970 | Matt et al. | 156/188 X |
| 4,132,579 | 1/1979 | VanAuken . | |
| 4,404,053 | 9/1983 | Saffire . | |
| 4,774,043 | 9/1988 | Beckmann | 264/137 X |
| 5,028,464 | 7/1991 | Shigetoh . | |
| 5,076,871 | 12/1991 | Freye et al. . | |
| 5,083,780 | 1/1992 | Walton et al. | 472/320 |
| 5,231,783 | 8/1993 | Utsuno et al. . | |
| 5,340,625 | 8/1994 | Weitsman et al. | 428/36.3 |
| 5,474,630 | 12/1995 | Rouillot | 156/149 |

FOREIGN PATENT DOCUMENTS

| | | | |
|---|---|---|---|
| 5262532 | 5/1977 | Japan | 273/80 |
| 3208625 | 9/1991 | Japan . | |

*Primary Examiner*—Jeff H. Aftergut
*Attorney, Agent, or Firm*—Malin, Haley, DiMaggio & Crosby, PA

[57] ABSTRACT

A method for making a reinforced tubular laminate. A dry braided fiber sleeve is placed between a mandrel and spiral tape wrap either over, under, or layered with a pre-preg material. During the initial stages of the curing process, while the temperature is rising, the resin in the pre-preg material flows and wets out the dry braid. When the final cure takes place, the braid becomes an integral part of the finished laminate. The choice of fiber materials and braid angle permit various tubular laminate strengths. The selection of fiber colors and patterns permit a wide variety of tubular laminate aesthetic characteristics.

9 Claims, 5 Drawing Sheets

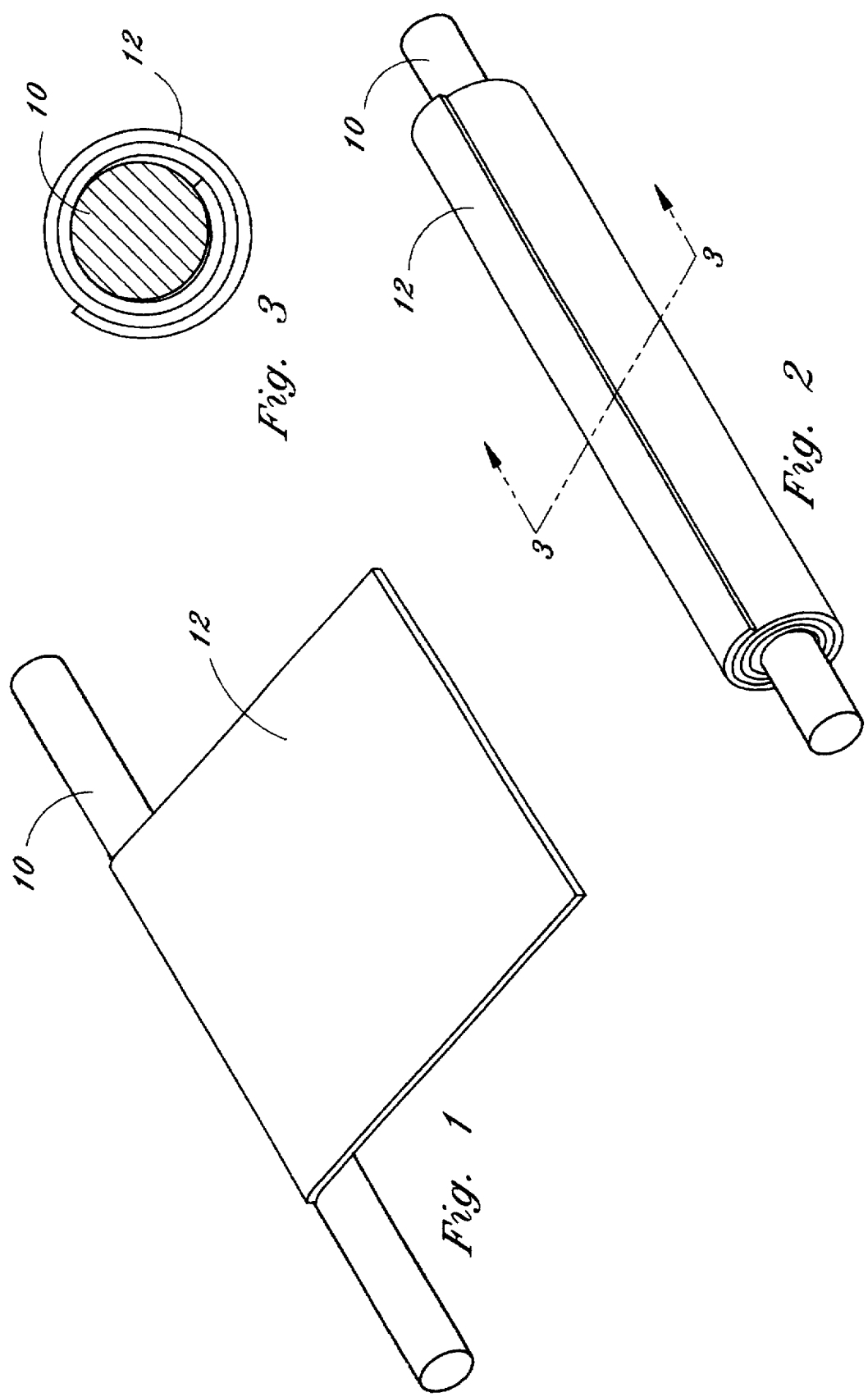

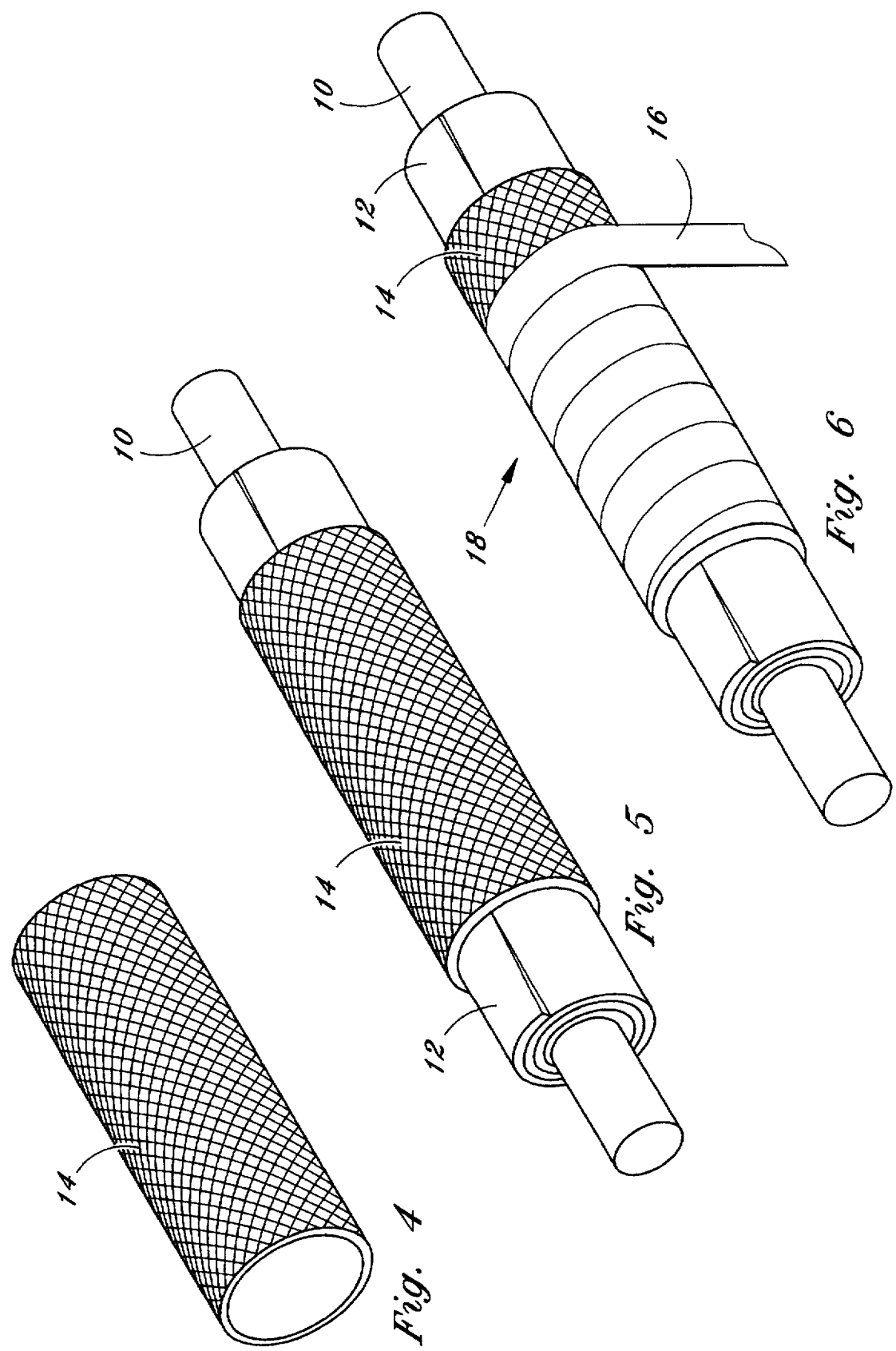

5,698,055

METHOD OF MANUFACTURING COMPOSITE TUBE

BACKGROUND OF THE INVENTION

1. Field of the Invention

This invention relates to a method of making a composite tube, and more particularly, to a method of making a reinforced tubular laminate using conventional pre-impregnated material and dry non-impregnated braid of fiberglass, carbon fiber, aramid, and/or like materials.

2. Background of the Invention

The use of pre-preg (fibrous material impregnated with uncured thermosettable resin) to form composite tubular articles is well known. One known method of making a tubular laminate is to convolute wrap a sheet of fiberglass cloth, which has been impregnated with an epoxy resin and catalyst, around a suitably shaped mandrel. The convolute wrap is then spiral wrapped, under tension, with a narrow width release tape, so as to apply external pressure to the underlying pre-preg material. The wrapped assembly is then cured in an oven at a temperature normally ranging between 250–350 degrees fahrenheit (F.), depending on the resin/catalyst system used. After cure, the mandrel and the release tape are removed.

An alternate method to using the spiral wrapped tape is to place a silicone rubber sleeve over the pre-preg material sealed at both ends and cured under pressure and heat.

Another method, used in U.S. Pat. No. 5,076,871 ('871), the disclosure of which is incorporated herein by reference, uses a release film and heat-shrinkable braided sleeve over a pre-preg material wrapped around a breakable mandrel. The release film and heat-shrinkable braid are removed after cure.

The '871 patent discloses that, in certain cases, the release film is not applied to the outer layer of the pre-preg material and the heat-shrinkable braid is not removed after cure. ('871 at col. 5, lines 55–66). The heat-shrinkable braid is used to apply pressure to the underlying pre-preg material in much the same manner as the spiral wrapped tape described above. The heat-shrinkable braid used in the '871 patent must be able to replace the spiral wrapped tape's pressure on the pre-preg material. In other words, the heat-shrinkable braid is used to maintain pressure on the pre-preg material, not to supply reinforcement to the tubular laminate after cure.

The '871 patent also discloses application of a non-heat-shrinkable braided sleeve for the formation of pre-preg articles of non-circular cross section. However, in this application, the non-heat-shrinkable braided sleeve must be elastomeric in nature, with the preferred material being polyvinyl alcohol. ('871 at col. 6, lines 14–32).

None of the related art disclose a method to reinforce a tubular laminate using a dry sleeve of suitable braided fiber, placed between the mandrel and the spiral wrapped tape, either over, under, or layered with the pre-preg material, which becomes an integral part of the finished tube after cure.

SUMMARY OF THE INVENTION

The present invention uses a dry braided sleeve made of fiberglass, carbon fiber, or aramid material such as that known under the trademark KEVLAR®, or similar material, or combination of such materials, to strengthen and provide a specific and selectable exterior appearance of the tubular laminate resulting from the method. During a known method for making a tubular laminate, as outlined above, an additional step is included by placing a dry braided sleeve over the convolute wrapped pre-preg material and under the spiral release tape wrap. (Alternately, a silicone rubber sleeve or heat-shrinkable braided sleeve and release film can be substituted for the spiral release tape).

During the curing process, the flow characteristics of the resin in the pre-preg material must be such that, during the initial phase of the cure cycle, when the temperature is rising, the resin must flow and completely wet the dry braid. When the final cure takes place, the braid becomes an integral part of the finished tube. The mandrel and release tape, (or silicone rubber sleeve, or release film and heat-shrinkable braid) are then removed, resulting in a reinforced tubular laminate construction with an exterior appearance dependent upon the braid selected.

There is considerable flexibility in the use of the dry braided sleeve in a tubular laminate process. The fiber material of the braid can be selected from a wide variety of choices such as fiberglass, carbon fiber, aramid composite material such as that known as KEVLAR®, other synthetic fibers, or a combination of fibers, to produce predetermined structural characteristics in the finished tube. The braid angle can also be varied to meet predetermined structural characteristics of the tube. In varying the fiber material or braid angle, characteristics such as strength and flexibility of the finished tube can be controlled. In addition, a wide variety of aesthetic effects can be achieved using different color fibers and patterns.

Construction of the composite tube itself can be varied. The dry braid can be placed on the mandrel prior to the convolute wrap of the pre-preg material. Also, more than one braided sleeve can be placed between multiple layers of pre-preg material, forming a "layered" laminate.

Accordingly it is an objective of the present invention to form a seamless reinforcement with a uniform wall thickness which adds considerable strength to a tubular laminate.

It is a further objective of the present invention to allow a flexible selection of braid fibers in the braided reinforcement sleeve, to produce predetermined structural characteristics in the finished tube.

It is still a further objective of the present invention to allow variation in the angle of the braid, to meet predetermined structural characteristics of the tube.

It is yet another objective of the present invention to allow a wide variety of aesthetic effects by using different color fibers and patterns in the braided sleeve.

In accordance with these and other objects which will become apparent hereinafter, the instant invention will now be described with particular reference to the accompanying drawings.

BRIEF DESCRIPTION OF THE DRAWINGS

FIG. 1 is a perspective view of the start of wrapping the pre-preg material onto the mandrel.

FIG. 2 is a perspective view of the convolute wrapping of the pre-preg material on the mandrel.

FIG. 3 is a cross-sectional view taken along section 3—3 of FIG. 2.

FIG. 4 is a perspective view of the dry braided sleeve.

FIG. 5 is a perspective view of one embodiment of the dry braided sleeve and the pre-preg material on the mandrel.

FIG. 6 is a perspective view of wrapping the spiral wrap of release tape on the braid/pre-preg material/mandrel assembly of FIG. 5.

DESCRIPTION OF THE PREFERRED EMBODIMENTS

Figure 7:
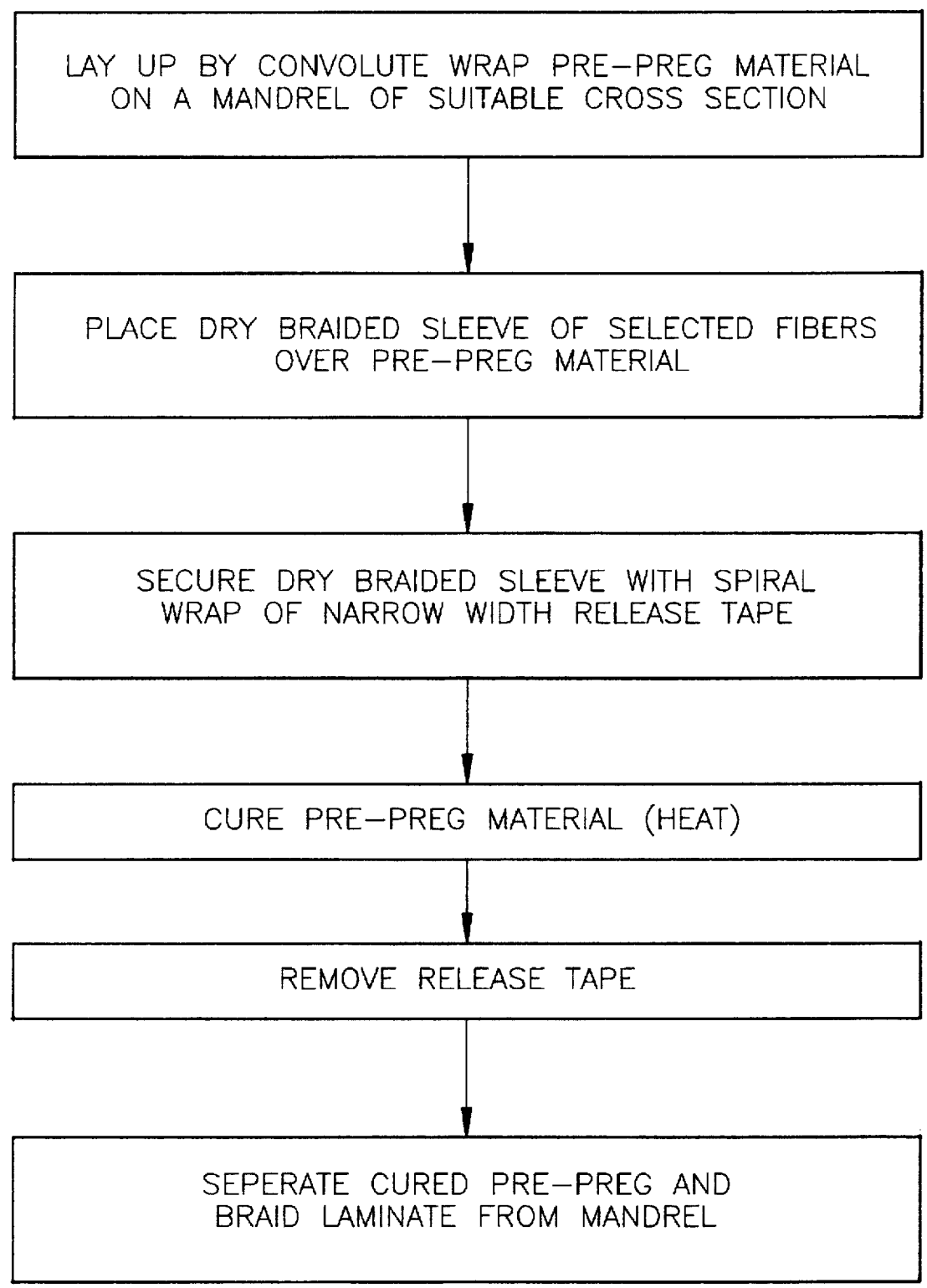
FIGS. 7–9 show flow diagrams of various embodiments of the present invention described herein.

Referring to FIGS. 1–3, a conventional pre-preg material 12 is convolute wrapped on mandrel 10. Mandrel 10 can be a solid bar (as shown), or other configuration, such as hollow, and can be reusable or breakable. Pre-preg material 12 is typically a sheet of fibrous material, such as fiberglass or other fiber cloth, impregnated with an uncured thermo-settable epoxy resin and catalyst system.

Next, dry braided sleeve 14, shown in FIG. 4, is placed over pre-preg material 12, as shown in FIG. 5. Dry braided sleeve 14 can be made of any suitable fiber braid such as fiberglass, carbon fiber, aramid composite such as that sold under the trademark KEVLAR®, or other fiber, or a combination of fibers depending on the characteristics of the tubular laminate desired. Braided sleeve 14 can also be braided at any angle desired and with different diameters of fibers to achieve different characteristics of tubular laminate. Furthermore, the selection of fibers can be made in various colors or patterns to arrive at a particular aesthetic appearance.

After braided sleeve 14 is placed over pre-preg material 12, narrow width release tape 16 is spiral wrapped around braided sleeve 14, as shown in FIG. 6. Release tape 16 holds braided sleeve 14 in place and is wrapped under tension to apply external pressure to the underlying pre-preg material 12.

Instead of using narrow width release tape 16, an alternate step is to use a silicone rubber sleeve or a heat-shrinkable sleeve and release film (not shown) to hold sleeve 14 in place and apply pressure to pre-preg material 12.

After application of the release tape, assembly 18, shown in FIG. 6, is then cured in an oven (not shown). Curing temperatures typically range between 250–350 degrees fahrenheit (F.), depending on the particular resin/catalyst used in pre-preg material 12. During the initial phase of the curing process, as the temperature is being raised, the resin in pre-preg material 12 must flow into and wet out dry braided sleeve 14, which is contained by tape wrap 16 (or silicone rubber sleeve or heat-shrinkable braided sleeve (not shown)). When curing is complete, the braided sleeve 14 becomes an integral part of the finished tubular laminate.

Alternately, curing can be accomplished by use of a hollow mandrel through which hot water or steam is made to flow. The mandrel can alternately contain an electric heating element. (Not shown). Heating from the inside can often be more efficient that using an oven for the curing process.

The steps described above, comprising the preferred embodiment of the present invention, are shown as a flow diagram in FIG. 7.

Figure 8:
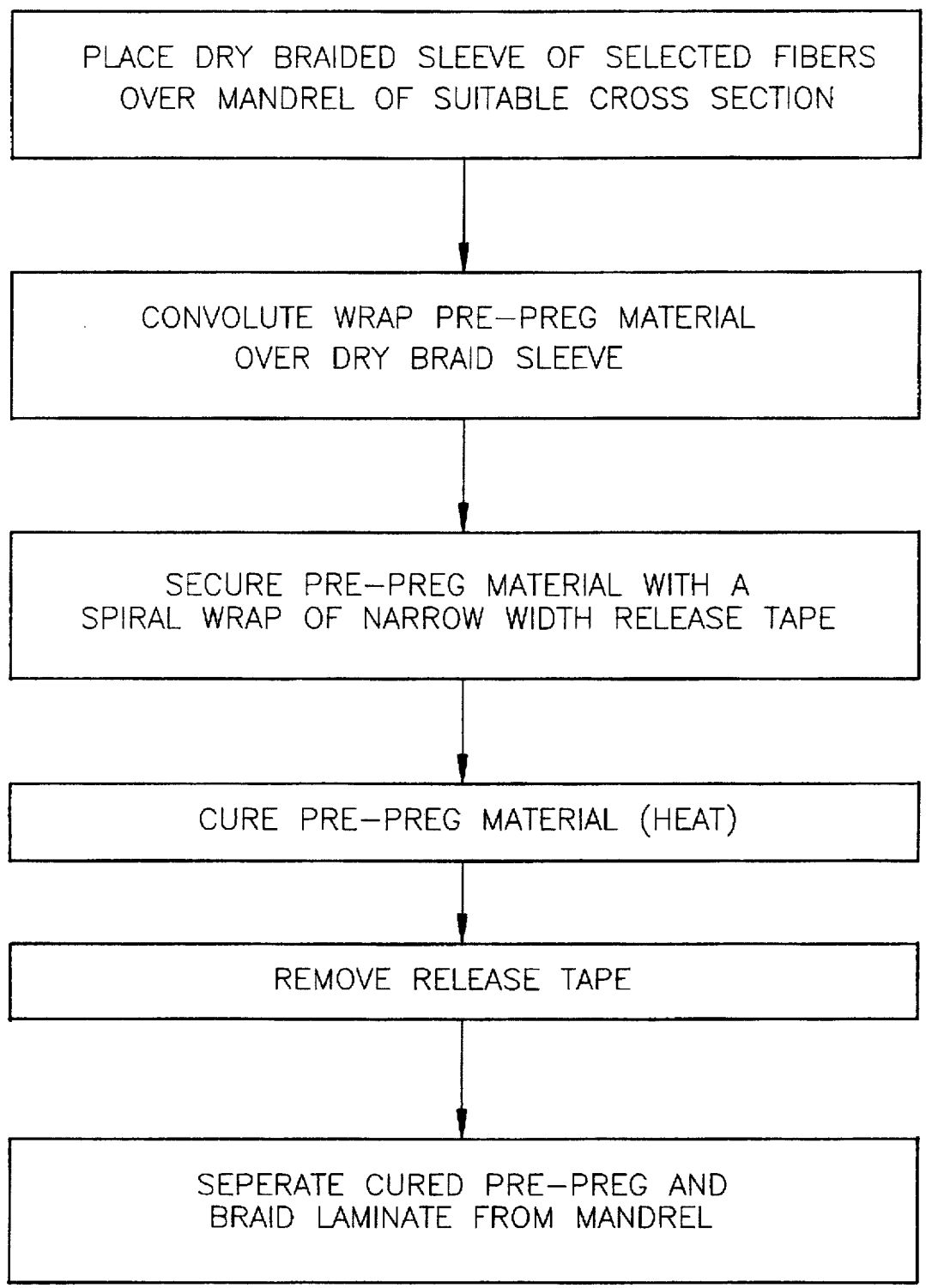

In an alternate embodiment of the present invention, dry braided sleeve 14 is placed on mandrel 12 before pre-preg material 12 is convolute wrapped. This embodiment is shown as a flow diagram in FIG. 8.

Figure 9:
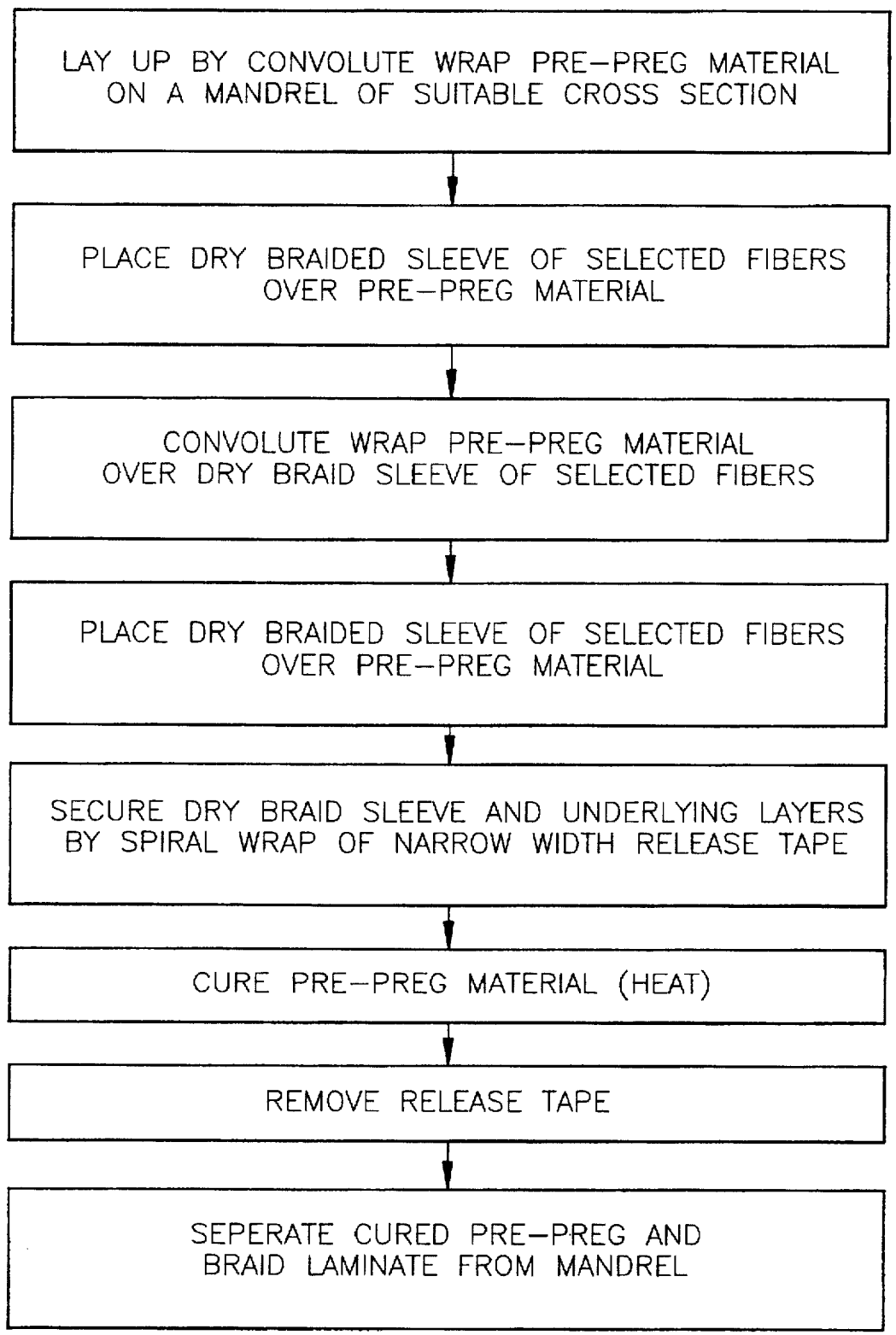

In still another embodiment, dry braided sleeve 14 and prepreg material 12 are placed on mandrel 10 as shown in FIG. 5, and then another layer of pre-preg material 12 is convolute wrapped and another dry braided sleeve 14 is placed over the second layer of pre-preg material 12. This "layered" embodiment is shown as a flow diagram in FIG. 9.

Similar to the above described "layered" embodiment, the dry braided sleeve 14 could be placed onto mandrel 10 prior to convolute wrapping the first layer of pre-preg material 12. Then another layer of dry braided sleeve 14 and another layer of pre-preg material 12. This embodiment is analogous to the flow diagram shown in FIG. 9, with the layering of pre-preg material and braided sleeves reversed in order.

The "layered" embodiments could be comprised of any number of additional layers, in any ordered desired, to achieve specific tubular laminate characteristics. Additional descriptions of specific embodiments of layered variations will not be detailed herein, but are contemplated as falling within the scope of the present invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of forming reinforced seamless composite tubular laminates comprising:
   (a) applying at least one layer of pre-preg material over a mandrel having a cross-section substantially matching the cross-section desired in the reinforced composite tubular laminate;
   (b) placing at least one layer of dry braided fiber reinforcing sleeve having a preselected exterior appearance over said pre-preg material;
   (c) securing said at least one layer of dry braided fiber reinforcing sleeve and said at least one layer of pre-preg material to said mandrel by spiral wrapping a release tape over said at least one layer of dry braided fiber reinforcing sleeve and said at least one layer of pre-preg material, to form an assembly;
   (d) substantially wetting said dry braided fiber reinforcing sleeve by flow from said pre-preg material by subjecting said assembly to heat;
   (e) substantially curing said pre-preg material by subjecting said assembly to heat;
   (f) removing said release tape; and,
   (g) separating said cured pre-preg material having the preselected exterior appearance of said dry braided fiber reinforcing sleeve from said mandrel to form the reinforced seamless composite tubular laminate.

2. The method of claim 1 wherein said dry braided fiber sleeve is composed of braided synthetic fibers.

3. The method of claim 2 wherein said fibers are selected from the group consisting of glass, carbon, and aramid.

4. The method of claim 1 wherein said fibers are a combination of fibers selected from the group consisting of glass, carbon, and aramid.

5. The method of claim 1 wherein said pre-preg material is composed of fibrous cloth impregnated with a resin and a catalyst.

6. The method of claim 5 wherein said fibrous cloth is composed of fibers selected from the group consisting of glass, carbon, and aramid.

7. The method of claim 5 wherein said fibrous cloth is composed of a combination of fibers selected from the group consisting of glass, carbon, and aramid.

8. The method of claim 1 wherein said mandrel is breakable.

9. The method of claim 1 wherein said mandrel is coated with a release material prior to the application of said pre-preg material.

* * * * *